(12) United States Patent
Dascher et al.

(10) Patent No.: US 8,270,460 B2
(45) Date of Patent: Sep. 18, 2012

(54) FILTER FOR IDENTIFYING SIGNAL ARTIFACTS IN BANDWIDTH-LIMITED INSTRUMENTS

(75) Inventors: David Dascher, Colorado Springs, CO (US); Allen Montijo, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 459 days.

(21) Appl. No.: 12/643,138

(22) Filed: Dec. 21, 2009

(65) Prior Publication Data

US 2011/0150068 A1    Jun. 23, 2011

(51) Int. Cl.
*H04B 3/46* (2006.01)
*H04B 1/10* (2006.01)

(52) U.S. Cl. ........................ 375/228; 375/350

(58) Field of Classification Search ................... 375/224, 375/228, 350
See application file for complete search history.

(56) References Cited

U.S. PATENT DOCUMENTS

| | | | | |
|---|---|---|---|---|
| 5,526,062 | A | * | 6/1996 | Harford ......................... 348/727 |
| 6,724,826 | B1 | * | 4/2004 | Varian ....................... 375/240.29 |
| 2006/0033936 | A1 | * | 2/2006 | Lee et al. ........................ 358/1.2 |

* cited by examiner

*Primary Examiner* — Don N Vo

(57) ABSTRACT

An apparatus and method for determining if ringing in an output signal from a receiver that processes an input signal is the result of a bandwidth limitation in the receiver that processes an input signal rather than ringing in the input signal is disclosed. The apparatus includes the receiver and a ring suppression filter. The ring suppression filter receives the receiver output signal and generates a ring suppressed output signal therefrom. The receiver and the ring suppression filter provide a first aggregate system response such that the ring suppressed output signal does not include ringing introduced by the receiver. The first aggregate system response is linear in phase.

10 Claims, 4 Drawing Sheets

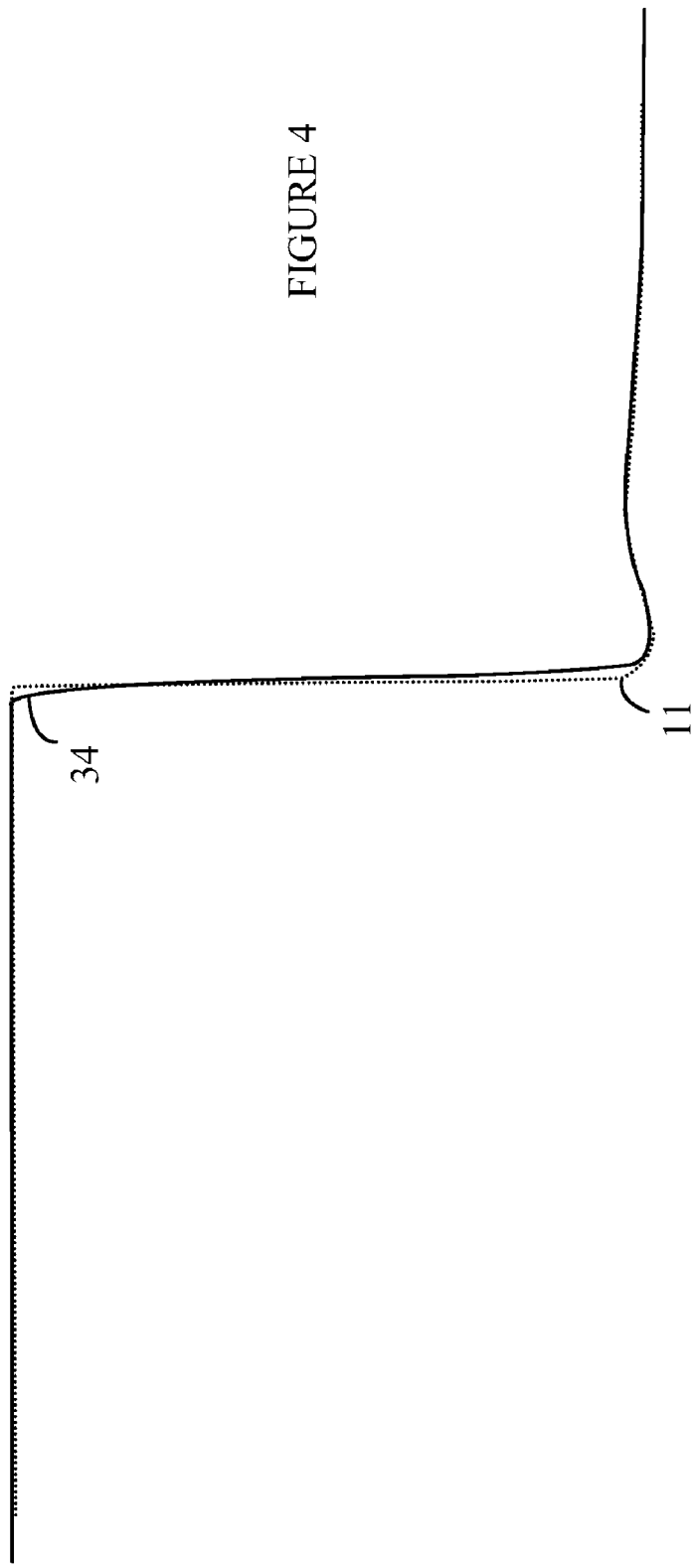

FILTER FOR IDENTIFYING SIGNAL ARTIFACTS IN BANDWIDTH-LIMITED INSTRUMENTS

BACKGROUND OF THE INVENTION

Essentially all measurement instruments that receive electrical signals are bandwidth limited. The signal that is perceived by the instrument can include artifacts that result from the bandwidth limitation. Consider an oscilloscope that receives a signal having a frequency spectrum that is significantly larger than the bandwidth of the oscilloscope. For example, the input signal could include a step function whose rise time is much faster than the rise time of the oscilloscope. The perceived signal lacks the high frequency components of the received signal for frequencies above the instrument frequency cut-off. As a result, the measured step function can include overshoot and ringing that is not present in the input signal. A user of the oscilloscope cannot easily determine if the overshoot and ringing observed in the signal displayed by the oscilloscope is present in the input signal or an artifact of the bandwidth limitation of the oscilloscope.

SUMMARY OF THE INVENTION

The present invention includes an apparatus and method for determining if ringing or overshoot in an output signal from a receiver that processes an input signal is the result of a bandwidth limitation in the receiver that processes an input signal rather than overshoot and/or ringing in the input signal. The apparatus includes a receiver having the bandwidth limitation and a ring suppression filter. The receiver receives an input signal and generates a receiver output signal therefrom, the receiver introducing ringing into the receiver output signal when the input signal is an impulse signal. The ring suppression filter receives the receiver output signal and generates a ring suppressed output signal therefrom. The receiver and the ring suppression filter provide a first aggregate system response such that the ring suppressed output signal does not include ringing when the input to the receiver is an impulse signal. The first aggregate system response is linear in phase.

In one aspect of the invention, the apparatus also includes a flat magnitude filter and switch. The flat magnitude filter receives the receiver output signal and generates a constant magnitude output signal, the receiver and flat magnitude filter providing a second aggregate system response that is substantially constant in magnitude as a function of frequency for frequencies below a cut-off frequency and linear in phase. The switch generating a switch output signal comprising one of the ring suppressed output signal and the constant magnitude output signal.

BRIEF DESCRIPTION OF THE DRAWINGS

FIG. 4 illustrates the input signal shown in FIG. 1 and a signal as measured by an oscilloscope after the input signal has been processed by a non-ringing filter according to the present invention.

DETAILED DESCRIPTION OF THE PREFERRED EMBODIMENTS OF THE INVENTION

Figure 1:
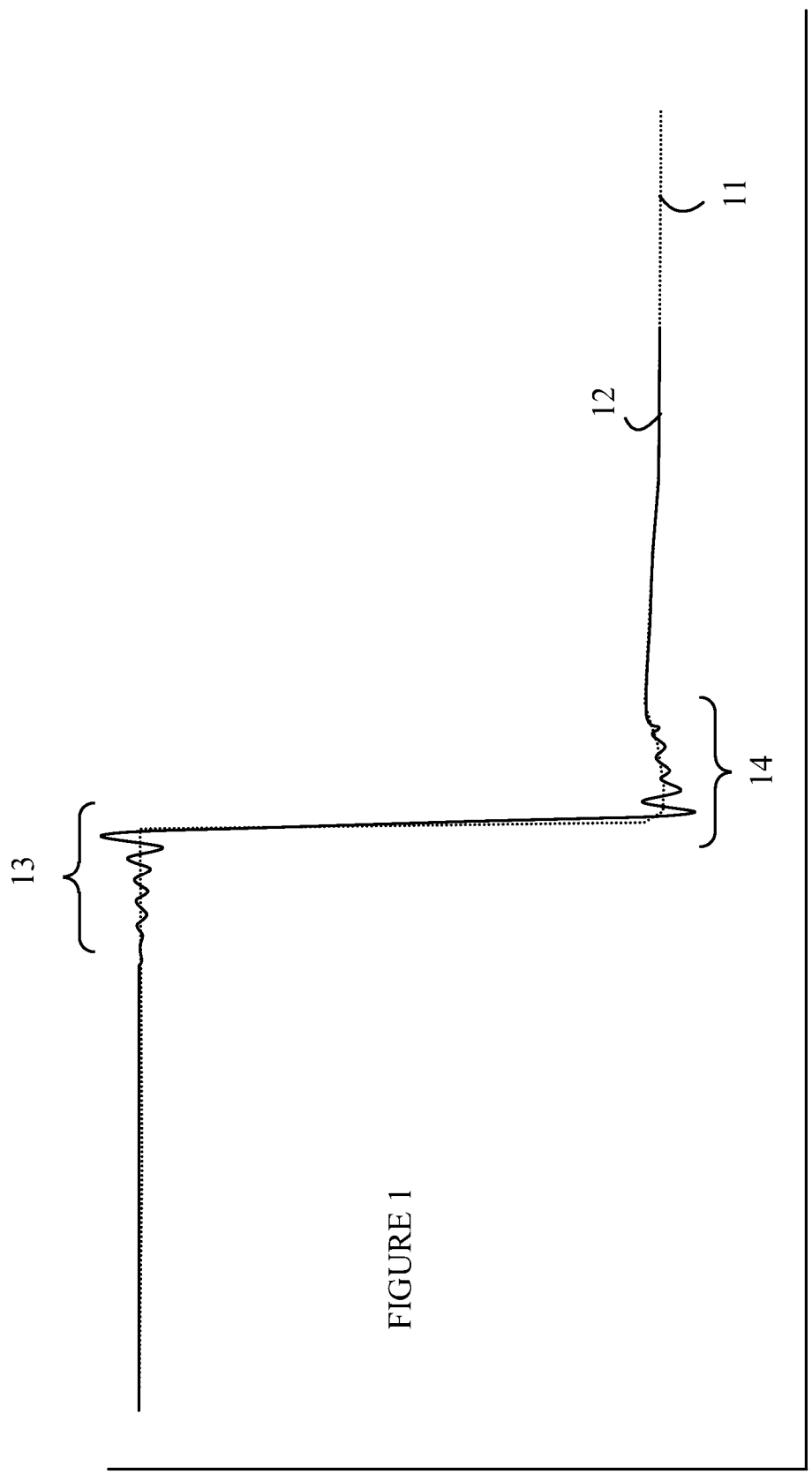
FIG. 1 illustrates an input signal and a signal as measured by an oscilloscope after the signal has been processed by a flat magnitude frequency response filter.

The manner in which the present invention provides its advantages can be more easily understood with reference to FIG. 1, which illustrates the trace produced by an oscilloscope for an input signal that consists of a step function whose transition time is much smaller than the rise time of the oscilloscope. In the example shown in FIG. 1, the input signal is repetitive, and hence, the signal can be viewed with a sampling oscilloscope to determine the input waveform. The signal as measured by a sampling oscilloscope is shown by the dotted curve at 11. The signal measured by a conventional oscilloscope having a low pass frequency response that cuts off the high frequency components of the signal is shown at 12. The sharp cutoff in the frequency response gives rise to the ringing shown at 13 and 14 in the signal measured by the conventional oscilloscope. It should be noted that the signal measured by the sampling oscilloscope, which provides a much greater bandwidth, lacks this ringing. Since the user of the conventional oscilloscope does not necessarily have access to a sampling oscilloscope or the signal in question is non-repetitive, and hence, cannot be viewed by a conventional sampling oscilloscope, a user of the conventional oscilloscope cannot determine whether the ringing is part of the input signal or an artifact of the limited bandwidth of the conventional oscilloscope.

Figure 2:
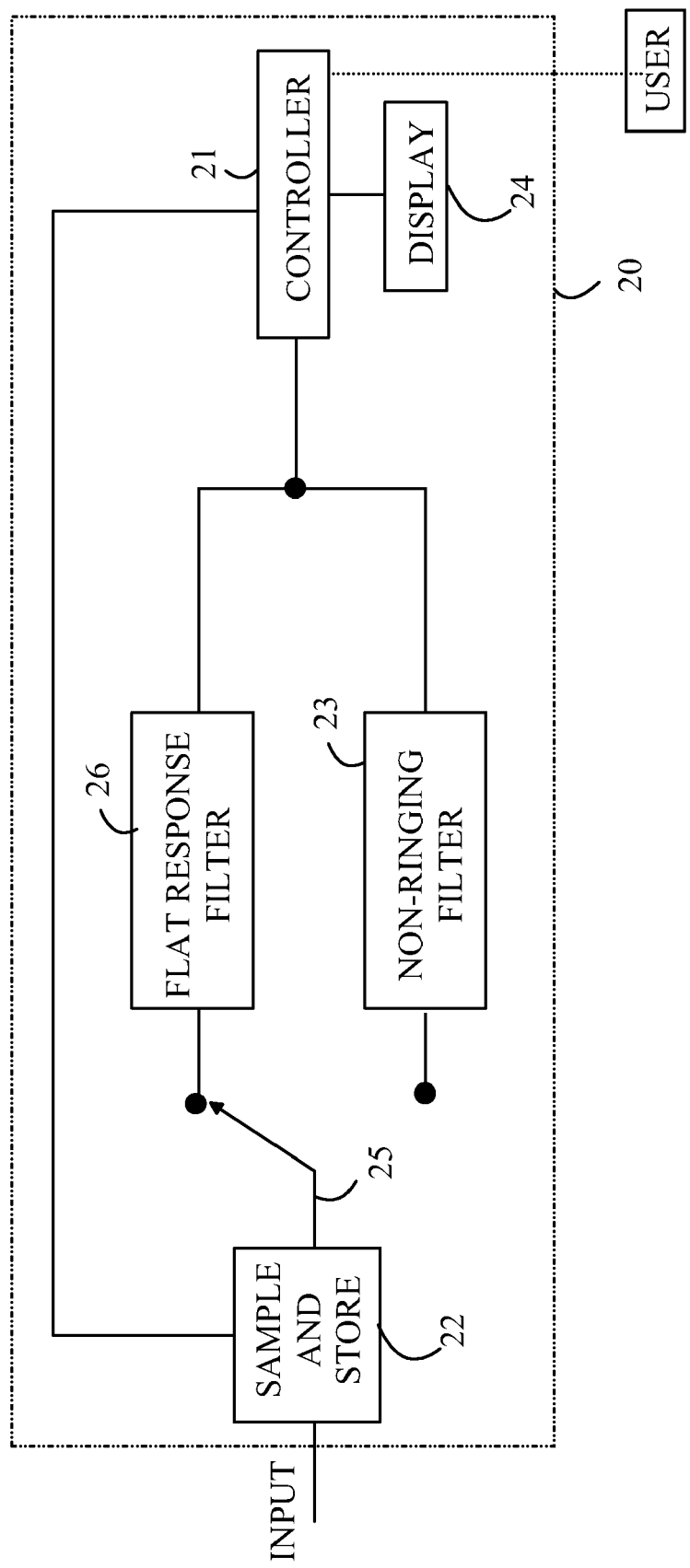
FIG. 2 illustrates an oscilloscope according to one embodiment of the present invention.

To simplify the following discussion, the present invention will first be described in terms of embodiments that provide an oscilloscope function. Refer now to FIG. 2, which illustrates an oscilloscope according to one embodiment of the present invention. Oscilloscope 20 includes a sample and store circuit 22 that digitizes an incoming signal and stores the digitized signal in a memory. Sample and store circuit 22 has a bandwidth limitation. Circuit 22 typically has three components, a sample and hold circuit, an analog-to-digital converter, and a memory that stores the digital data generated by the analog-to-digital converter. The sample and hold circuit is inherently a low pass filter. Typically, a filter 26 is used to compensate for part of the response error introduced by the sample and hold circuit and any artifacts introduced by the analog-to-digital converter. The combination of sample and store circuit 22 and filter 26 is a system response that is flat in frequency and linear in phase for frequencies below some cut-off frequency; however, even the output of filter 26 is bandwidth limited, since there is a limit with respect to the amount of compensation that can be provided with respect to the low pass filtering of the sample and store circuit, since the compensating filter inherently amplifies noise in the incoming signal. This residual bandwidth limitation results in ringing in the signal seen by controller 21 that is an artifact of this bandwidth limitation.

In general, a system is defined to introduce ringing if the response of that system to an input signal consisting of a positive impulse is negative over a portion of the output signal. In practice, any input signal is only an approximation to an impulse, since any real signal has a non-zero rise time. In addition, while an ideal non-ringing system never generates an impulse response that swings negative, some degree of negative swing can often be tolerated depending on the application. For example, a negative swing that is below the detection threshold of the instrument that is viewing the output can be viewed as satisfying a non-ringing condition. Hence, for the purposes of this discussion, a response function of a system will be defined as being non-ringing if the output signal obtained by inputting a positive impulse signal having a rise time faster than a predetermined value does not generate an output signal that swings negative by more than a predetermined amount. The rise time of the impulse signal should be much faster than the fastest rise time that is detectable by the system. The degree of negative swing that can be tolerated will depend on the particular instrument and function being implemented in the instrument. For the purposes of this discussion, the acceptable degree of negative swing will be assumed to be less than 0.5 percent of the amplitude of the impulse, and ideally, less than the minimum swing that can be detected by the instrument.

Refer again to FIG. 2. If the user of oscilloscope 20 sees a signal on display 24 that includes ringing, the user can "replay" the signal through non-ringing filter 23. If the resultant signal no longer displays a ringing behavior, the user knows that the original ringing is an artifact of the finite bandwidth of the combined response of sampling circuit 22 and filter 26. For the purposes of this discussion, a filter placed after a receiving component will be defined to be a "non-ringing" or "ring suppression" filter if the combined response of the receiving component and that filter will not introduce ringing into the output when an impulse signal is received by the receiving component.

In general, a low-pass filter can be constructed that assures that the aggregate response of sample and store circuit 22, and non-ringing filter 23 will not introduce ringing even though the aggregate response of these elements is bandwidth limited in a manner that cuts off a significant fraction of the high-frequency energy in the input signal. However, if the low-pass filter reduces the frequency content of the signal leaving circuit 22 by too much, the resultant output signal will have other undesirable artifacts. For example, an input signal consisting of an impulse will be converted to a pulse having a greater width when processed through non-ringing filter 23 than when processed through filter 26. One goal of the present invention is to provide a filter that prevents ringing while minimizing the degradation of any sharp transitions in the input signal.

To simplify the following discussion, the term system response will be used to describe the combined response of sample and store circuit 22 and filter 23. Given a desired form of the system response, the desired response of filter 23 can be computed from the measured response of sample and store circuit 22.

The problem of finding a non-ringing aggregate system response that minimizes the degradation of an impulse signal can be viewed as an optimization problem. The system response can be viewed as a filter that has attenuation as a function of frequency and a phase shift as a function of frequency. For example, an input signal consisting of an impulse is transformed into the frequency domain and the resultant frequency components are attenuated by the corresponding attenuation values and the phase of the signal is shifted by the corresponding phase shift. The optimization algorithm searches for the attenuation values and phase shifts that provide the minimum width for the output pulse while not producing any ringing in the output pulse.

The phase shifts are determined by the requirement that the delay through the filter is the same for all frequency components; hence, only the attenuation values need be optimized. For any given set of attenuations, the optimization program determines if the output signal resulting from an impulse input signal includes a negative swing that is more than the predetermined maximum swing allowed to be viewed as "non-ringing". If the output includes such a swing, the set of attenuations is discarded and a new set is chosen. If the output does not include such a negative swing, the width of the output signal resulting from the impulse input signal is determined and compared to the best smallest width seen to date. If the width is less than the smallest width found to date, the new set of attenuations replaces the previously determined best response function. In either case, a new set of attenuations is chosen and the procedure repeated until the iteration is stopped because no smaller width is obtained or some other end of search criterion is met.

Mathematical optimization algorithms for selecting the successive sets of attenuation coefficients to test are known to the art and hence, will not be discussed in detail here. The reader is directed to standard textbooks and specifically to techniques based on "annealing" or gradient search strategies for exploring a surface in an N-dimensional space. In the present application, N is the number of attenuation values as a function of frequency.

Figure 3:
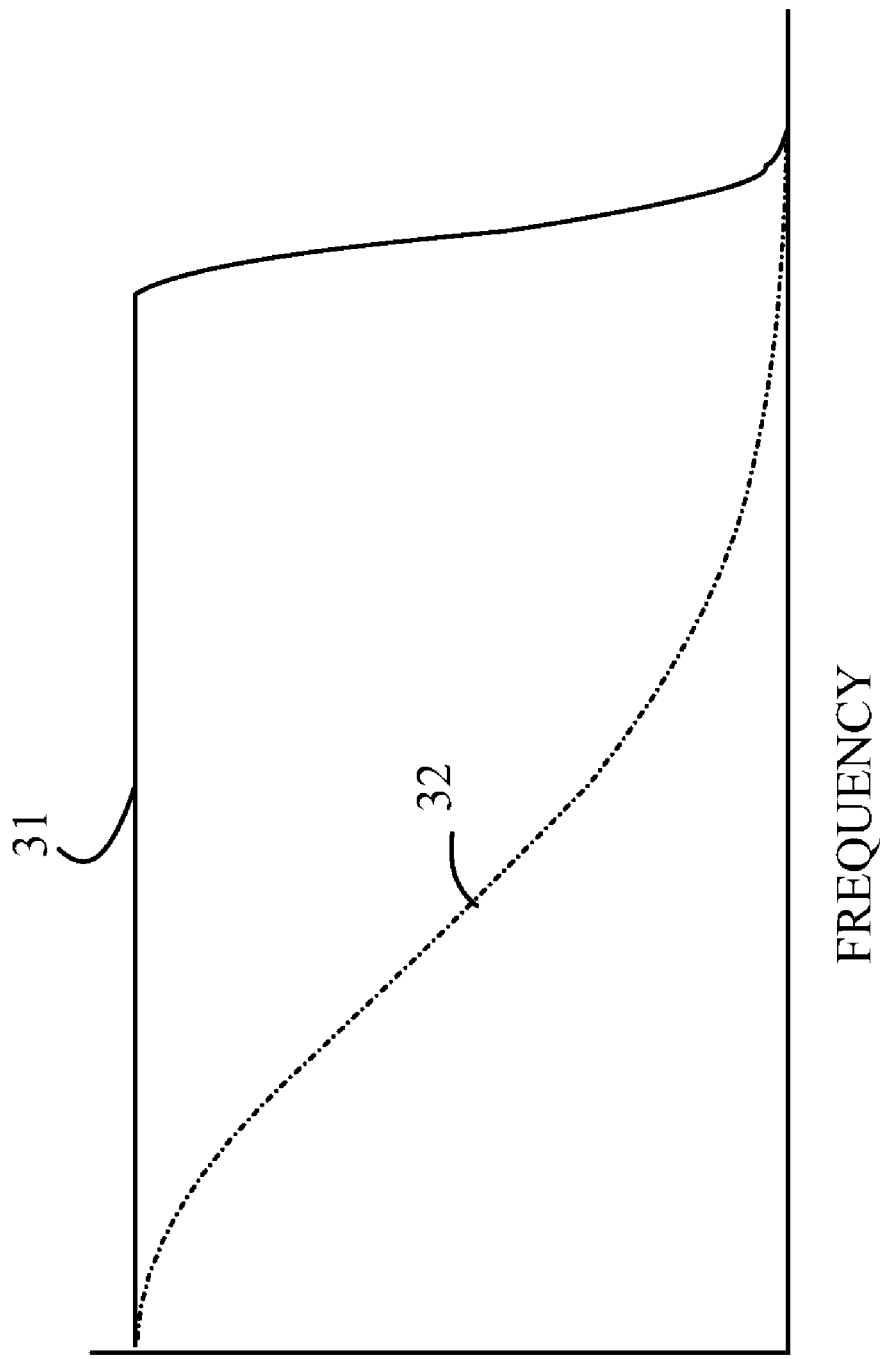
FIG. 3 illustrates a flat magnitude frequency response and a non-ringing Gaussian frequency response.

The speed with which such optimization algorithms converge to a solution often depends on the initial starting values for the attenuation parameters discussed above. It has been found that a good approximation to the desired non-ringing system response is an attenuation function that is approximately Gaussian in shape with a mean at zero frequency. Refer now to FIG. 3, which illustrates a flat magnitude response 31 corresponding to the combined response of sample and store circuit 22, and filter 26 and a non-ringing response 32 corresponding to sample and store circuit 22, and filter 23 in which the non-ringing system response is a Gaussian aggregate system response. That is, the magnitude response of the combination of circuit 22, and filter 23 is $A(f)=e^{-f^2/s}$, where A is the attenuation at frequency f and S is a constant that is chosen to minimize the width of the output signal generated by an impulse input signal. As the parameter S is increased, the increase in the pulse width is reduced. However, there reaches a point at which increasing S leads to ringing in the response function. This reduces the problem to a one-parameter optimization problem that seeks the largest value of S that does not produce ringing. For the purposes of this discussion, the optimum Gaussian aggregate system response is defined to be the Gaussian response discussed above with S chosen to be the maximum value that does not result in ringing in the output signal when an input signal consisting of an impulse is introduced into the bandwidth limited component, e.g., sample and store circuit 22. In one aspect of the present invention, the optimum Gaussian aggregate system response is used as the starting point for the optimization strategy discussed above.

Any system response that is better than the optimum Gaussian aggregate system response will have a frequency response that is characterized by an attenuation as a function of frequency that is less than that provided by the optimum Gaussian system response. Hence, any improvement over the Gaussian system response involves searching for filter coefficients that lead to an aggregate system response that lies above the starting Gaussian response.

Filters 23 and 26 can be implemented digitally using digital signal processors (DSPs). Since the difference between the filters is a matter of the weights in the corresponding finite impulse response filters, a single DSP can be utilized. In this case, switch 25 merely changes the program used to process the output of sample and store circuit 22.

Refer now to FIG. 4, which illustrates the input signal shown in FIG. 1 and the signal 34 as measured by oscilloscope 20 after the input signal has been processed by a non-ringing filter according to the present invention. The processing through the non-ringing filter has eliminated the ringing artifacts introduced by the finite bandwidth of sample and store circuit 22. While the resultant signal lacks the ringing artifacts, the high frequency components of the signal have been attenuated and, hence, the fall time of the signal is somewhat longer than that of the input signal.

The above-described embodiments of the present invention have been directed to oscilloscopes. However, the principles of the present invention can be applied to any instrument system in which a bandwidth limitation of the instrument can lead to ringing in a signal, and the user needs to determine if the ringing is the result of the bandwidth limitation or a property of the input signal itself. That is, sample and store circuit 22 shown in FIG. 2 could be replaced by any circuit that has a bandwidth limitation of concern and generates a digital signal as its output.

It should also be noted that the flat response filter shown at 26 is optional both in terms of implementing an oscilloscope function or providing a non-ringing system response to assure that the bandwidth limitation of the receiving component does not introduce ringing.

The above-described embodiments of the present invention utilize an arrangement in which the non-ringing filter is used to process the signal from the system component that has the bandwidth limitation, and the output of the bandwidth limiting component is digital. This arrangement allows the non-ringing filter to be implemented in digital hardware such as DSPs. However, in principle, the non-ringing filter could be implemented in a manner in which the non-ringing filter is placed in front of the system component having the bandwidth limitation. The parameters of a non-ringing filter that processes the signal before the signal is introduced into the bandwidth limited component can be determined in a manner analogous to that described above. In this regard, if the non-ringing filter is implemented as a finite impulse response filter, the same filter that was used to process the output of the bandwidth limited component can be used to process the input to the bandwidth limiting component to assure that any ringing in the output of the bandwidth limiting component was not due to the bandwidth limitation in that component. The advantage of the embodiments shown above lies in the ability to operate on digital signals. If the filter must operate in front of the bandwidth-limiting component, the filters would need to be analog in nature. Analog filters that provide the desired properties present design challenges that are avoided by using a filter after the bandwidth-limiting component.

The above-described embodiments of the present invention and the Summary of the Invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising
a receiver having a bandwidth limitation, said receiver receiving an input signal and generating a receiver output signal therefrom, said receiver introducing ringing into said receiver output signal when said input signal is an impulse signal; and
a ring suppression filter that receives said receiver output signal and generates a ring suppressed output signal therefrom, said receiver and said ring suppression filter providing a first aggregate system response such that said ring suppressed output signal does not include ringing when said input to said receiver is an impulse signal, and wherein said first aggregate system response is linear in phase.

2. The apparatus of claim 1 wherein said first aggregate system response has an amplitude response as a function of frequency that is greater than or equal to the optimal Gaussian aggregate system response.

3. The apparatus of claim 1 further comprising a flat magnitude filter and switch, wherein said flat magnitude filter receives said receiver output signal and generates a constant magnitude output signal, said receiver and said flat magnitude filter providing a second aggregate system response that is substantially constant in magnitude as a function of frequency for frequencies below a cut-off frequency and linear in phase, said switch generating a switch output signal comprising one of said ring suppressed output signal and said constant magnitude output signal.

4. The apparatus of claim 3 further comprising a display for displaying said switch output signal.

5. The apparatus of claim 1 wherein said receiver comprises a sample and store circuit that digitizes said input signal and stores the resulting samples.

6. The apparatus of claim 1 wherein said ring suppression filter comprises a DSP.

7. A method for determining if ringing in a receiver output signal generated by a receiver having a bandwidth limitation is present in an input signal to that receiver, said method comprising:
providing a ring suppression filter that receives said receiver output signal and generates a ring suppressed output signal therefrom, said receiver and said ring suppression filter providing a first aggregate system response such that said ring suppressed output signal does not include ringing when said input to said receiver is an impulse signal; and
comparing said ring suppressed output signal to said receiver output signal.

8. The method of claim 7 wherein said first aggregate system response has an amplitude response as a function of frequency that is greater than or equal to the optimal Gaussian aggregate system response.

9. The method of claim 7 further comprising providing a flat magnitude filter, wherein said flat magnitude filter receives said receiver output signal and generates a constant magnitude output signal, said receiver and said flat magnitude filter providing a second aggregate system response that is substantially constant in magnitude as a function of frequency for frequencies below a cut-off frequency and linear in phase; and comparing said ring suppressed output signal and said constant magnitude output signal.

10. The method of claim 9 further comprising displaying said ring suppressed output signal and said constant magnitude output signal.

* * * * *